(12) United States Patent
Tsai

(10) Patent No.: US 6,947,778 B2
(45) Date of Patent: Sep. 20, 2005

(54) HANDHELD ELECTRONIC DEVICE

(75) Inventor: Yuh-Huei Tsai, Taipei (TW)

(73) Assignee: High Tech Computer, Corp., Tao Yuan (TW)

( * ) Notice: Subject to any disclaimer, the term of this patent is extended or adjusted under 35 U.S.C. 154(b) by 201 days.

(21) Appl. No.: 10/249,940

(22) Filed: May 21, 2003

(65) Prior Publication Data

US 2004/0198246 A1 Oct. 7, 2004

(30) Foreign Application Priority Data

Jan. 15, 2003 (TW) ........................ 92200685 U

(51) Int. Cl.[7] .............................................. H04M 1/00
(52) U.S. Cl. ............... 455/575.4; 455/90.1; 379/433.12
(58) Field of Search ........................ 379/433.01, 433.11, 379/433.12, 434, 440, 433; 455/90, 550.1, 575.1, 575.2, 575.3, 575.4

(56) References Cited

U.S. PATENT DOCUMENTS

| | | | | |
|---|---|---|---|---|
| 5,461,672 A | * | 10/1995 | Enokido et al. | ........ 379/433.02 |
| 6,073,027 A | * | 6/2000 | Norman et al. | .......... 455/575.4 |
| 6,308,084 B1 | * | 10/2001 | Lonka | ...................... 455/556.1 |
| 6,438,393 B1 | * | 8/2002 | Suuronen | .................. 455/575.1 |

* cited by examiner

Primary Examiner—Nguyen T. Vo
Assistant Examiner—Nhan T. Le
(74) Attorney, Agent, or Firm—Jianq Chyun IP office

(57) ABSTRACT

A handheld electronic device (10) mainly consists of a cover unit (12), a base unit (14) and a sliding mechanism (100). The base unit has a supporting surface (14d). The cover unit has a supporting surface (12b) which is arranged on the supporting surface of the base unit in a way that the cover unit is capable of sliding with respect to the base unit between closed and open positions. The sliding mechanism is arranged between the cover unit and the base unit in order to guide the relative sliding between the cover unit and the base unit. The sliding mechanism substantially consists of a pushing positioner (110) and a sliding slot (120), which are respectively arranged at the base unit and the cover unit. The pushing positioner consists of a sleeve (112), a ball (114) received in the sleeve, a resilient element (116) received in the sleeve and pushing the ball so that the ball has a portion engaging in the slot and a round plate (118) engaging in the sleeve. The position of the round plate is adjustable thereby adjusting the pushing force of the resilient force acting on the ball. The slot further has front and rear recessed concavities (124, 122). The ball engages in the rear concavity at the open position, and in the front concavity at the closed position.

12 Claims, 6 Drawing Sheets

HANDHELD ELECTRONIC DEVICE

CROSS REFERENCE TO RELATED APPLICATIONS

This application claims the priority benefit of Taiwan patent application serial no. 92200685, filed on Jan. 15, 2003.

BACKGROUND OF INVENTION

1. Field of the Invention

This invention relates in general to a handheld electronic device, and more specifically to a handheld electronic device which has a cover unit and a base unit. The cover unit can slide smoothly and noiselessly on the base unit between open and closed positions.

2. Description of Related Art

Responding to a demand for making electronic devices lighter and thinner, electronic components have been developed with a tendency towards volume-miniaturization. Because the function of electronic components is more and more powerful and the volume thereof is more and more small, an electronic device of handheld type has been developed to replace electronic devices with a large size. The handheld electronic devices are for example, mobiles phone, PDAs (personal digital assistants) and handheld game consoles. In order to satisfy the demand of miniaturization, some handheld electronic devices are designed to have a sliding mechanism interconnecting a cover unit and a base unit whereby the cover unit can move relative to the base unit between an open position and a closed position. At the open position, an input unit, for example, a keypad of the handheld device is exposed. At the closed position, the keypad is covered by the cover unit. At the closed position, the handheld device has a reduced length whereby the handheld device can occupy a volume as small as possible.

Generally, for the above handheld device having a sliding mechanism, a display module is arranged on the cover unit, and a host system and a keypad are arranged in the base unit. A flexible printed circuit board is used to electrically connect the host system and the display module. The conventional sliding mechanism interconnecting the cover unit and the base unit of the electronic device, which is a structure of guide rail and guide slot, has drawbacks as follows.

The position of the guiding rail is not adjustable. If the position of the guiding rail is deviated from its intended position due to a deformation of the guiding rail during formation thereof by plastic injection molding, the cover unit and the base unit cannot have a precise fitting therebetween, resulting in that a smooth operation cannot be obtained when the cover unit is moved relative to the base unit.

Because the base unit and the cover unit are usually made of plastic material and the guiding rail and guiding slot are integrally formed therewith, the fit between the guide rail and the guide slot will be loose after repeat sliding movement between the cover unit and the base unit.

Because the guide rail and the guide slot have a linear contact which has a large friction, after repeat sliding movements between the cover unit and base unit, noise will be generated and the sliding between the guide rail and the guide slot will become not smooth.

SUMMARY OF INVENTION

According to the foregoing description, an object of this invention is to provide a handheld electronic device having a cover unit slideably mounted on a base unit via a sliding mechanism. The sliding mechanism can be adjusted to precisely fit the base unit and the cover unit together. Furthermore, the sliding mechanism interconnects the cover unit and the base unit in a point contact manner.

According to the above and other objects of this invention, a handheld electronic device is provided, which comprises a base unit and a cover unit slideably mounted on the base unit. The cover unit is moveable relative to the base unit between open and closed positions. A sliding mechanism interconnects the base unit and the cover unit. The sliding mechanism comprises a sliding slot defined in the cover unit and a pushing positioner mounted in the base unit.

The pushing positioner comprises a sleeve, having a first end and a second end opposite the first end, and an internal thread arranged in an inner wall of the sleeve near the first end thereof. A ball is arranged in the sleeve, wherein an external diameter of the ball is smaller than an internal diameter of the sleeve, and an external diameter of the ball is larger than a diameter of an opening in the second end of the sleeve to allow the ball to partially protrude out of the second end. A resilient element is arranged in the sleeve and pushes the ball toward the second end. A round plate has an external thread threadedly engaging with the inner thread of the sleeve. The position of the round plate is adjustable by rotating the round table relative to the sleeve.

The base unit comprises a host system and a keypad, and the cover unit comprises a display module. Additionally, front and rear recessed concavities are defined in front and rear ends of the sliding slot of the cover unit, respectively. At the open position, the ball is pushed by the resilient element to have a portion engaging in the rear concavity. At the closed position, the ball is pushed by the resilient element to have a portion engaging in the front concavity.

A recess is defined in a side face of the round plate. The round plate abuts against an end of the resilient element distant from the ball. By adjusting the position of the round plate by engaging a screwdriver in the recess and rotating the round plate, a relative position between the round plate and sleeve is changed along an axial direction of the sleeve, whereby the force acting on the ball by the resilient element is also adjusted.

Because the sliding mechanism of the present invention uses a ball to engage in a slot which has a point contact, and the force acting on the ball to cause the ball to engage in the slot is adjustable, the cover and base units of the handheld electronic device can fit with each other precisely, and the sliding movement between them is noiseless and very smooth.

BRIEF DESCRIPTION OF DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings.

DETAILED DESCRIPTION

Figure 1:
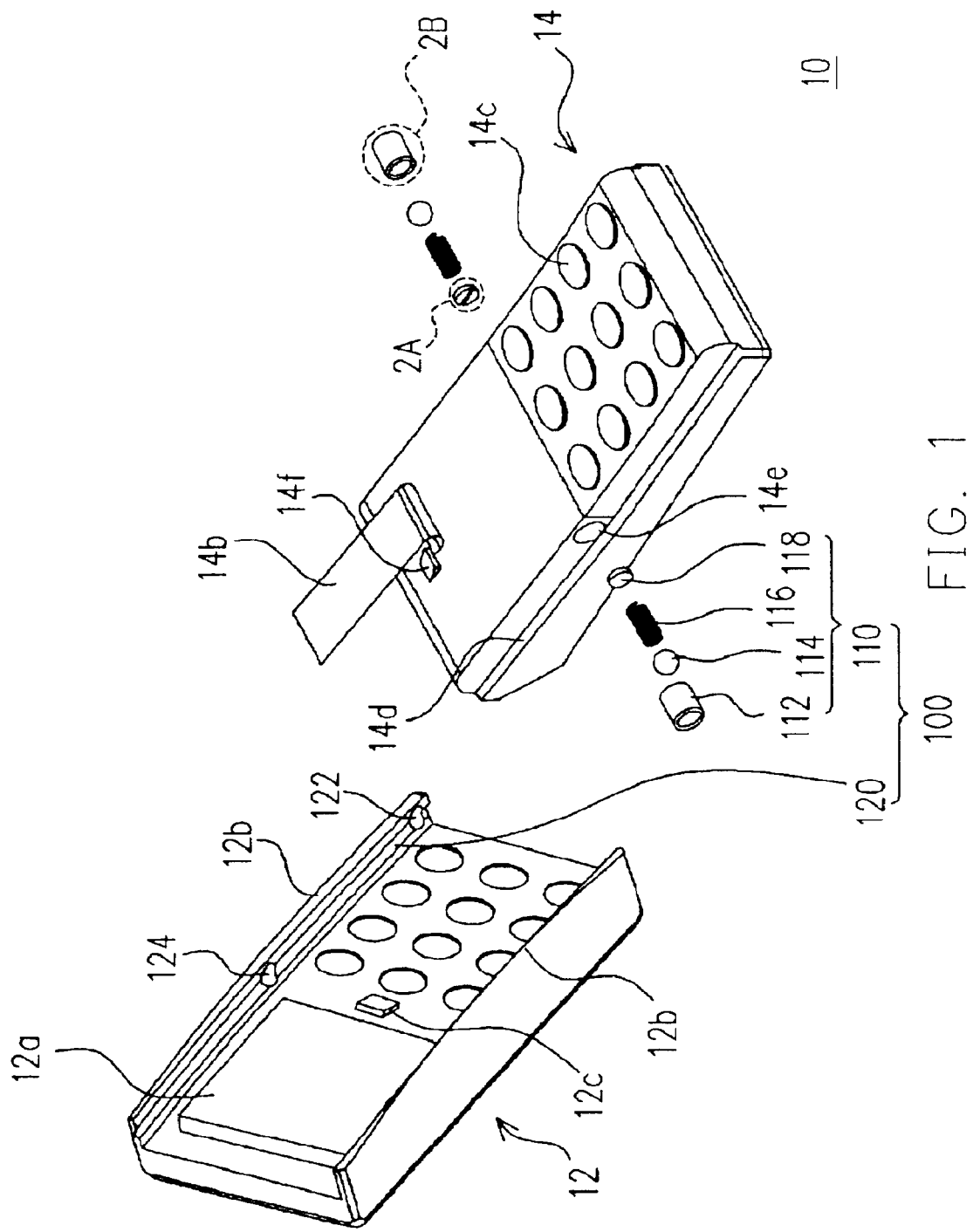
FIG. 1 is an exploded perspective view of a handheld electronic device according to a preferred embodiment of the present invention.
Figure 2A:
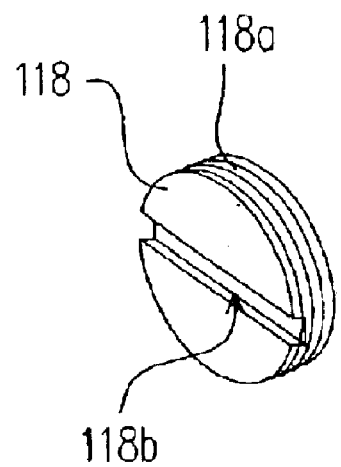
FIG. 2A is an enlarged view of a round plate of the handheld electronic device indicated by referenced number 2A of FIG. 1.
Figure 2B:
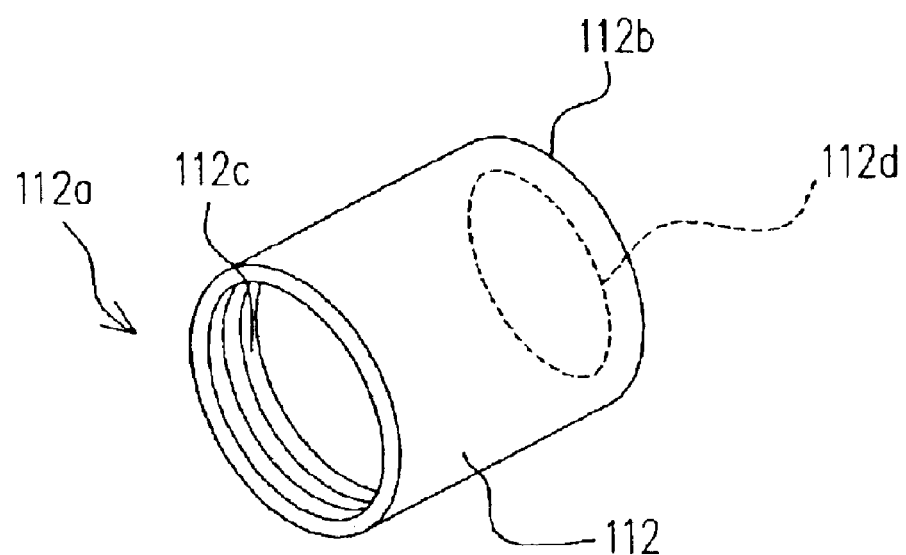
FIG. 2B is an enlarged view of a sleeve of the handheld electronic device indicated by referenced number 2B of FIG. 1.

FIG. 1 shows a handheld electronic device according to a preferred embodiment of the present invention. Referring to FIG. 1, the handheld electronic device 10 is a mobile phone, for example. The handheld electronic device 10 consists of a cover unit 12, a base unit 14 and a sliding mechanism 100. A display module 12a is arranged in the cover unit 12. The display module 12a is an LCD (liquid crystal display) panel serving as an output terminal of visual information of the handheld electronic device 10. A host system 14a (see FIG. 5) is arranged in the base unit 14. The host system 14a is a PC board (printed circuit board) mounted with a central processing unit (CPU) and other electronic components. The host system 14a is electrically connected to the display module 12a through an FPC board (flexible printed circuit board) 14b. A keypad 14c is arranged on the base unit 14. This keypad 14c serves as an input device for the handheld electronic device 10. A user can control various functions built inside the host system 14a by operating this keypad 14c. It is noted that, the cover unit 12 has a first supporting surface 12b, and the base unit 14 has a second supporting surface 14d that corresponds to the first supporting surface 12b. The cover unit 12 is slideably mounted on the base unit 14, and when the cover unit 12 slides, the second supporting surface 14d supports the first supporting surface 12b. The structure and arrangement of the sliding mechanism 100 will be explained in detail as the follows.

Figure 3:
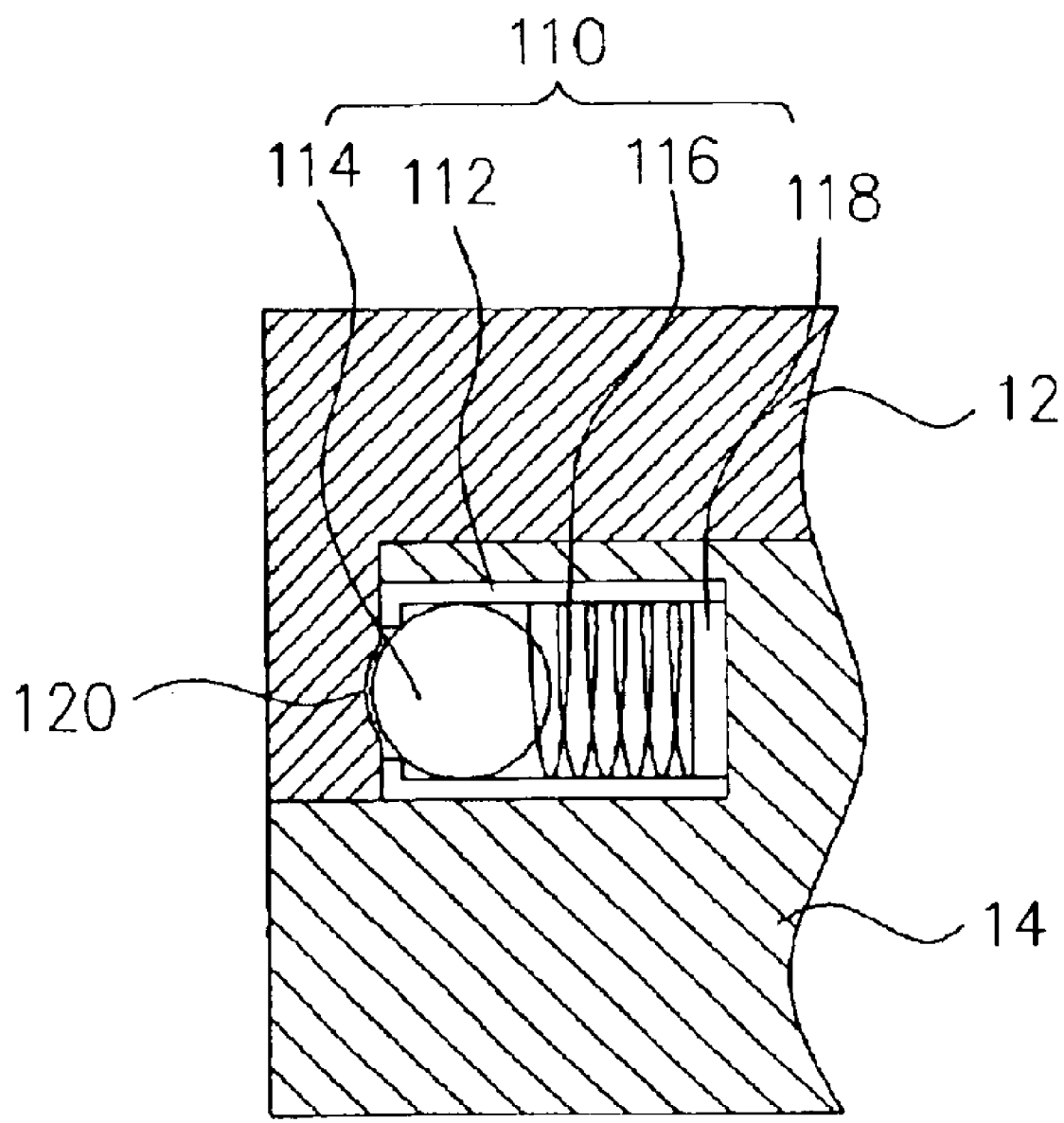
FIG. 3 is a partially cross-sectional view of the handheld electronic device of FIG. 1.

FIG. 3 is a partially cross-sectional view of the handheld electronic device 10 particularly showing the sliding mechanism 100 in an enlarged manner.

Referring to FIGS. 1, 2A, 2B and 3, the sliding mechanism 100 comprises a pushing positioner 110 and a sliding slot 120. The pushing positioner 110 is arranged in the base unit 14, and the sliding slot 120 is formed on the cover unit 12. The pushing positioner 110 comprises a sleeve 112, a ball 114, a resilient element 116 and a round plate 118. The sleeve 112 has a first end 112a and a second end 112b opposite the first end 112a, and an internal thread 112c formed in an inner wall of the sleeve 112 near the first end 112a. The ball 114 is arranged inside the sleeve 112. The ball 114 has a diameter greater than a diameter of an opening 112d of the second end 112b of the sleeve 112. The ball 114 is allowed to partially protrude out of the opening 112d. The part of the ball 114 that protrudes out of the opening 112d serves as a protrusion for engaging in the sliding slot 120.

According to the above description, the resilient element 116 is a helical spring, for example. The resilient element 116 is arranged inside the sleeve 112 and pushes the ball 114 toward the opening 112d of the second end 112b of the sleeve 112. Moreover, an external thread 118a is formed in a circumferential periphery of the round plate 118, and a recess 118b is formed in a side face of the round plate 118 away from the resilient element 116. By using a tool (such as a screwdriver) to rotate the round plate 118 through an engagement between the tool and this recess 118b, the round plate 118 can be screwed to the inner thread 112c in the inner wall of the first end 112a of the sleeve 112 so that the resilient element 116 is pressed to push the ball 114 toward the opening 112d. The ball 114 thus always has a portion protruding out of the opening 112d of the second end 112b of the sleeve 112. A distance for the round plate 118 screwed in the sleeve 112 is adjustable to adjust the force of the resilient element 116 pushing the ball 114. The assembled pushing positioner 110 is installed in the base unit 14 in such a way that the pushing positioner 110 is embedded in an installation hole 14e at a side edge of the base unit 14, in which the ball 114 also partially protrudes out of the installation hole 14e. The portion of the ball 114 protruding out of the opening 112d and the hole 14e is correspondingly fitted in the sliding slot 120 and resiliently abuts against a wall of the cover unit 12 defining the sliding slot 120. It is noted that, when the cover unit 12 slides with respect to the base unit 14, the protruding part of the ball 14 will continuously abut against the wall of the cover unit 12 defining the sliding slot 120 due to the force (resilient force) acting on the ball 14 by the resilient element 116, and the ball 114 will slide or rotate (see FIG. 3) in the sliding slot 120 and engages with the cover unit 12 in a point-contact manner.

Figure 4A:
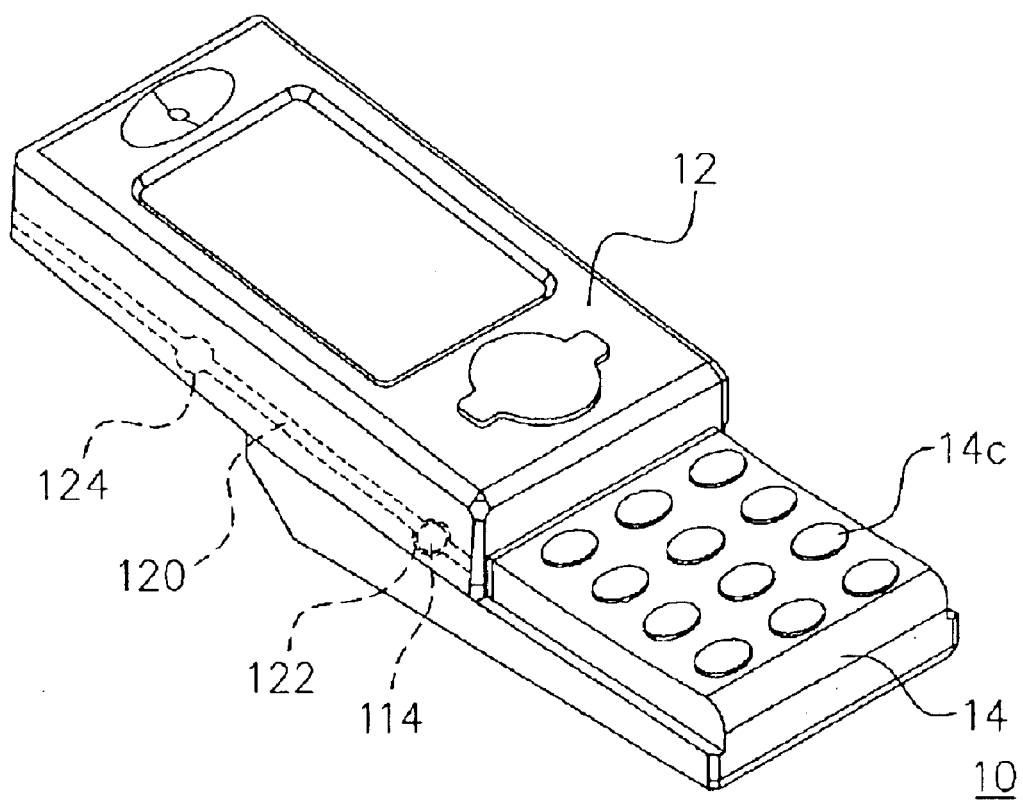
FIG. 4A and FIG. 4B respectively show a cover unit of the handheld electronic device of FIG. 1 at an open position and a closed position.
Figure 4B:
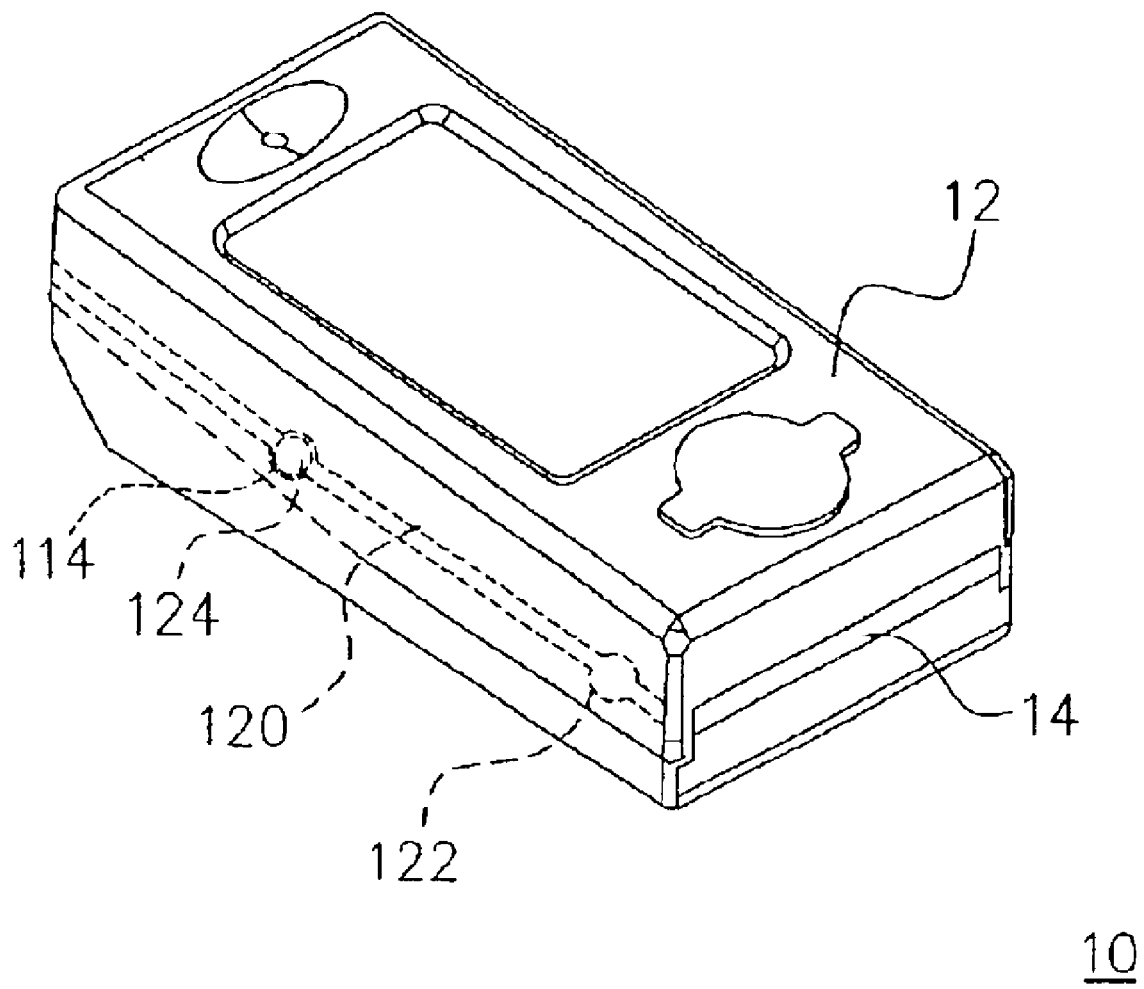

FIGS. 4A and 4B show the cover unit 12 of the handheld electronic device 10 according to the preferred embodiment of the present invention respectively at an open position and a closed position. Referring to FIGS. 1, 4A and 4B at the same time, the sliding slot 120 has a rear concavity 122 and a front concavity 124, which respectively correspond to the open position and the closed position, and are recessed in rear and front ends of the sliding slot 120. As shown in FIG. 4A, when the cover unit 12 slides relative to the base unit 14 to the open position, the part of the ball 114 protruding out of the opening 112d enters into the rear concavity 122 by the pushing force of the resilient element 116, such that the cover unit 12 is positioned at the open position relative to the base unit 14. At the open position, the keypad 14c is exposed. As shown in FIG. 4B, when the cover unit 12 slides relative to the base unit 14 in a direction to the closed position, the part of the ball 114 in the rear concavity 122 firstly slides in the slot 120 and then enters the front concavity 124 such that the cover unit 12 is positioned at the closed position relative to the base unit 14. At the closed position, the keypad 14c is covered by the cover unit 12.

Figure 5:
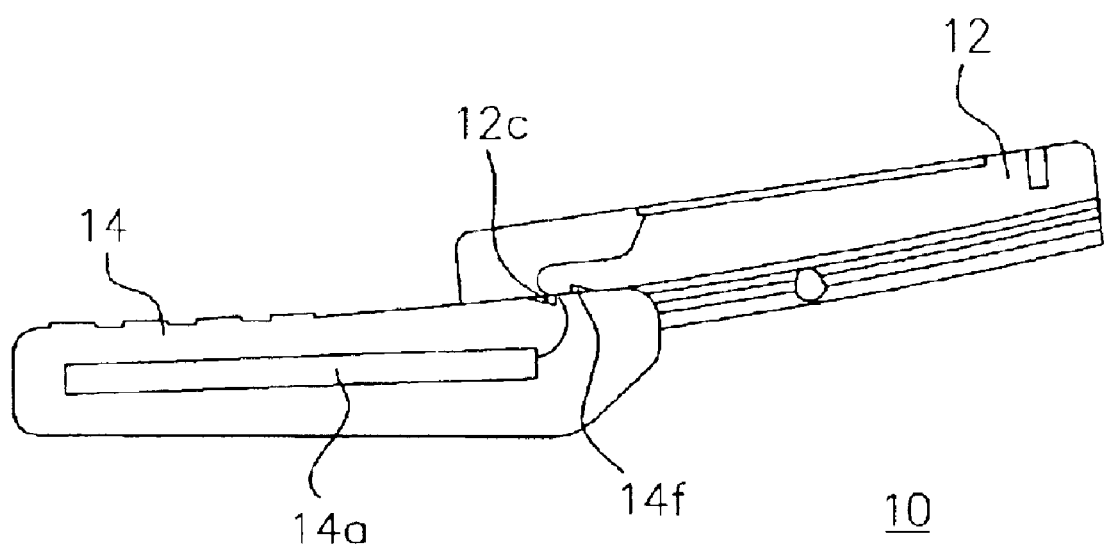
FIG. 5 is a side cross-sectional view of the handheld electronic device of FIG. 1.

FIG. 5 is a side cross-sectional view of the handheld electronic device 10 As shown in FIG. 5, in order to enable the cover unit 12 to be more reliably positioned at the open position, a first engaging block 12c is arranged on the cover unit 12, and a second engaging block 14f is arranged on the base unit 14. When the cover unit 12 slides relative to the base unit 14 to the open position, the first engaging block 12c of the cover unit 12 engages with the second engaging block 14f of the base unit 14. By this design, therefore, even if the cover unit 12 is pulled toward the open position by a large force, it will not separate from the base unit 14.

In this preferred embodiment, the pushing positioner 110 of the sliding mechanism 100 is arranged in the base unit 14, and the sliding slot 120 is correspondingly arranged on the cover unit 12. However, one skilled in the art can easily understand that the pushing positioner 110 can be alternatively arranged in the cover unit 12 and the sliding slot 120 can alternatively arranged on the base unit 14. Although the handheld electronic device 10 as shown in this preferred embodiment is a mobile phone, this is not a limitation to this invention. The handheld electronic device 10 can be a PDA, a handheld game console or other electronic device having a cover unit slideably mounted on a base unit of the device.

According to the above description, the handheld electronic device 10 of the present invention has at least the following advantages.

By the engagement between the balls 114 and the recessed concavities 122, 124 in which the balls 114 are pushed by the resilient elements 116, the cover unit 12 can be reliably positioned at the open and closed positions relative to the base unit 14.

By the use of the balls 114, which have a point-contact with the cover unit 12 when the balls 114 moves in the slots 120, the cover unit 12 can thus smoothly and easily move from the open to the closed position and vice versa.

The position of the round plates 118 is changeable relative to the sleeves 112 to thereby adjust the force (resilient force) generated by the resilient elements 116 acting on the balls 114. Therefore, the engaging force between the balls 114 and the cover unit 12 is adjustable so that an optimal fitting condition between the cover unit 12 and the base unit 14 can be obtained.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A handheld electronic device, comprising:

a first unit;

a second unit slideably mounted with the first unit between an open position and a closed position; and a sliding mechanism, arranged between the first unit and the second unit in order to guide relative sliding between the first unit and the second unit, and the sliding mechanism comprising a pushing positioner in the first unit, and a sliding slot in the second unit, the pushing positioner comprising:

a ball and a resilient element pushing the ball toward the slot, the ball having at least a portion engaging in the slot;

a sleeve, having a first end and a second end opposite the first end, and an internal thread formed in an inner wall of the sleeve near the first end, wherein the ball is arranged in the sleeve, the ball having a diameter larger than a diameter of an opening of the second end to thereby allow the ball to partially protrude out of the second end, the resilient element being arranged in the sleeve and exerting a pushing force to the ball toward the second end; and a round plate received in the first end of the sleeve and threadedly engaging with the internal thread of the sleeve, the round plate engaging with the resilient element.

2. The device of claim 1, wherein the first unit comprises a host system and a keypad, and the second unit comprises a display module.

3. The device of claim 1, wherein a first concavity and a second concavity that respectively correspond to the open position and the closed position are recessed in sliding slot.

4. The device of claim 1, wherein position of the round plate relative to the sleeve is adjustable so that the pushing force of the resilient element acting on the ball is adjustable.

5. A handheld communication device comprising:

a base unit, having a first supporting surface;

a cover unit, having a second supporting surface slideably mounted on the first supporting surface whereby the cover unit can move relative to the base unit between open and closed positions and a sliding mechanism, arranged between the base unit and the cover unit in order to guide the relative sliding between the base unit and the cover unit, and the sliding mechanism comprising a pushing positioner and a sliding slot, which are respectively arranged at the base unit and the cover unit, the sliding slot having two recessed concavities in two ends thereof corresponding to the open and closed positions, respectively, and the pushing positioner having a ball which is pushed to engage in one of the two concavities when the cover unit is moved to one of the open and closed positions relative to the base unit, wherein the pushing positioner further comprises:

a sleeve, having a first end, and a second end the first end, and an internal thread formed in an inner wall of the sleeve near the first end, the ball being arranged in the sleeve;

a resilient element arranged in the sleeve and pushing the ball in a manner that the ball has a position protruding out of the second end of the sleeve; and a round plate threadedly engaging with the internal thread in the first end of the sleeve and engaging with the resilient element, the position of the round plate being adjustable to adjust the force of resilient element pushing the ball.

6. The handheld communication device of the claim 5, wherein the base unit comprises a host system and a keypad, and the cover unit comprises a display module.

7. The handheld communication device of 5 wherein a first engaging block is arranged on the cover unit and a second engaging block is arranged on the base unit, and at the open position, the first engaging block engages with the second engaging block to prevent a separation of the cover unit from the base unit due to a too large force is used to move the cover unit relative to the base unit to the open position.

8. A handheld electronic device, comprising:

a base unit having a host system and a keypad;

a cover unit having a display, said cover being slideably mounted on the base unit and moveable between open and closed positions, wherein at the closed position, the keypad is covered by the cover unit and at the open position the keypad is exposed; and a sliding mechanism comprising a slot defined in the cover unit and a pushing positioner in the base unit, the pushing positioner comprising:

a ball and a resilient element exerting a pushing force on the ball to cause the ball to have a portion engaging in the slot, wherein the pushing force of the resilient element is adjustable;

a sleeve in the base unit, the ball being received in the sleeve, the resilient element being received in the sleeve, the resilient element having first end engaging with the ball and a second end opposite the first end, and a plate mounted in sleeve and enraging with the second end of the resilient element, the position of the plate being adjustable to thereby adjust the pushing force of the resilient element acting at the ball.

9. The handheld electronic device of claim 8, wherein the plate has a round shape and threadedly engages in the sleeve.

10. The handheld electronic device of claim 9, wherein the resilient element is a helical spring.

11. The handheld electronic device of claim 10, wherein the slot has two recessed concavities in two ends thereof, corresponding to the open and close positions of the cover unit.

12. The handheld electronic device of claim 11, wherein the cover unit has a first engaging block and the base unit has a second engaging block, and wherein at the open position, the first engaging block engages with the second engaging block.

* * * * *